US012462776B2

(12) United States Patent
Nagatsuma

(10) Patent No.: US 12,462,776 B2
(45) Date of Patent: Nov. 4, 2025

(54) STAND AND KEYBOARD INSTRUMENT SET

(71) Applicant: CASIO COMPUTER CO., LTD., Tokyo (JP)

(72) Inventor: Shigeyuki Nagatsuma, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 289 days.

(21) Appl. No.: 18/133,376

(22) Filed: Apr. 11, 2023

(65) Prior Publication Data

US 2023/0335086 A1 Oct. 19, 2023

(30) Foreign Application Priority Data

Apr. 14, 2022 (JP) ................................ 2022-066720

(51) Int. Cl.
*G10G 5/00* (2006.01)

(52) U.S. Cl.
CPC .................................... *G10G 5/00* (2013.01)

(58) Field of Classification Search
CPC ........................................................ G10G 5/00
See application file for complete search history.

(56) References Cited

U.S. PATENT DOCUMENTS 4,378,100 A * 3/1983 Minozzi ................ F16M 11/04 248/440
7,677,010 B2 * 3/2010 Boots ................... E04B 1/5806 403/219
9,984,667 B2 * 5/2018 Walker .................. F16M 13/02
2018/0199705 A1 * 7/2018 Atkins .................... G10G 5/00
2018/0352949 A1 * 12/2018 Newsome ............. A47B 19/10
2023/0335086 A1 * 10/2023 Nagatsuma ............. G10G 5/00
2023/0335088 A1 * 10/2023 Nagatsuma ............. G10G 5/00

FOREIGN PATENT DOCUMENTS

CN 204318218 U * 5/2015
CN 110507085 A * 11/2019
CN 214711455 U * 11/2021
CN 215338105 U * 12/2021
CN 215649826 U * 1/2022
CN 216358381 U * 4/2022
GB 2564652 A * 1/2019 ............ G10D 13/08
GB 2595709 A * 12/2021 .......... F16M 13/022
JP H0679338 U * 11/1994
JP 08-292768 A 11/1996
JP 11-202858 A 7/1999
JP 2004-267009 A 9/2004
JP 2008-003493 A 1/2008
JP 3182648 U 4/2013

OTHER PUBLICATIONS

JPO; Application No. 2022-066720; Notice of Reasons for Refusal dated Mar. 5, 2024.

* cited by examiner

*Primary Examiner* — Robert W Horn
(74) *Attorney, Agent, or Firm* — Fitch, Even, Tabin & Flannery LLP

(57) ABSTRACT

A stand includes a horizontal spanning member, a connector including a polygonal portion and to which the horizontal spanning member is fixed, and a first leg member including a first leg main body having a rectangular horizontal cross section and configured to be fixed to a first surface of the polygonal portion.

11 Claims, 9 Drawing Sheets

160 CONNECTING MEMBER
10 KEYBOARD INSTRUMENT
150 HORIZONTAL SPANNING MEMBER
160 CONNECTING MEMBER
1 KEYBOARD INSTRUMENT SET
Up UPPER SIDE
L LEFT SIDE
LR LEFT-RIGHT DIRECTION
R RIGHT SIDE
B BACK SIDE
UL UPPER-LOWER DIRECTION
111 FIRST LEG MAIN BODY
110 FIRST LEG MEMBER
Lo LOWER SIDE
120 SECOND LEG MEMBER
F FRONT SIDE
FB FRONT-BACK DIRECTION
250
250
100 STAND
121 SECOND LEG MAIN BODY
120 SECOND LEG MEMBER
121 SECOND LEG MAIN BODY
122 121g
210
210 210
200
112 111g
122 121g
111 FIRST LEG MAIN BODY
110 FIRST LEG MEMBER
111g 112

STAND AND KEYBOARD INSTRUMENT SET

CROSS-REFERENCE TO RELATED APPLICATION

This patent application is based upon and claims the benefit of priority under 35 USC 119 of Japanese Patent Application No. 2022-066720 filed on Apr. 14, 2022, the entire disclosure of which, including the specification, claims, drawings and abstract, is incorporated herein by reference in its entirety.

BACKGROUND

Technical Field

The present disclosure relates to a stand and a keyboard instrument set.

Description of the Related Art

For example, Japanese Utility Model Registration No. 3182648 publicly discloses an example of a stand. With a stand like the one so disclosed, there is, for example, a case in which the stand is set with lower ends of legs kept in forcible abutment with a wall surface or the like. At this time, the lower ends of the legs are often strongly pushed against the wall or the like, and to deal with this, a predetermined rigidity is required for the legs.

SUMMARY

According to an aspect of the present disclosure, there is provided a stand including a horizontal spanning member, a connector including a polygonal portion and to which the horizontal spanning member is fixed, and a first leg member including a first leg main body having a rectangular horizontal cross section and configured to be fixed to a first surface of the polygonal portion.

According to another aspect of the present disclosure, there is provided a keyboard instrument set including the stand and a keyboard instrument disposed on an upper side of the stand.

DESCRIPTION OF THE EMBODIMENT

Figure 1:
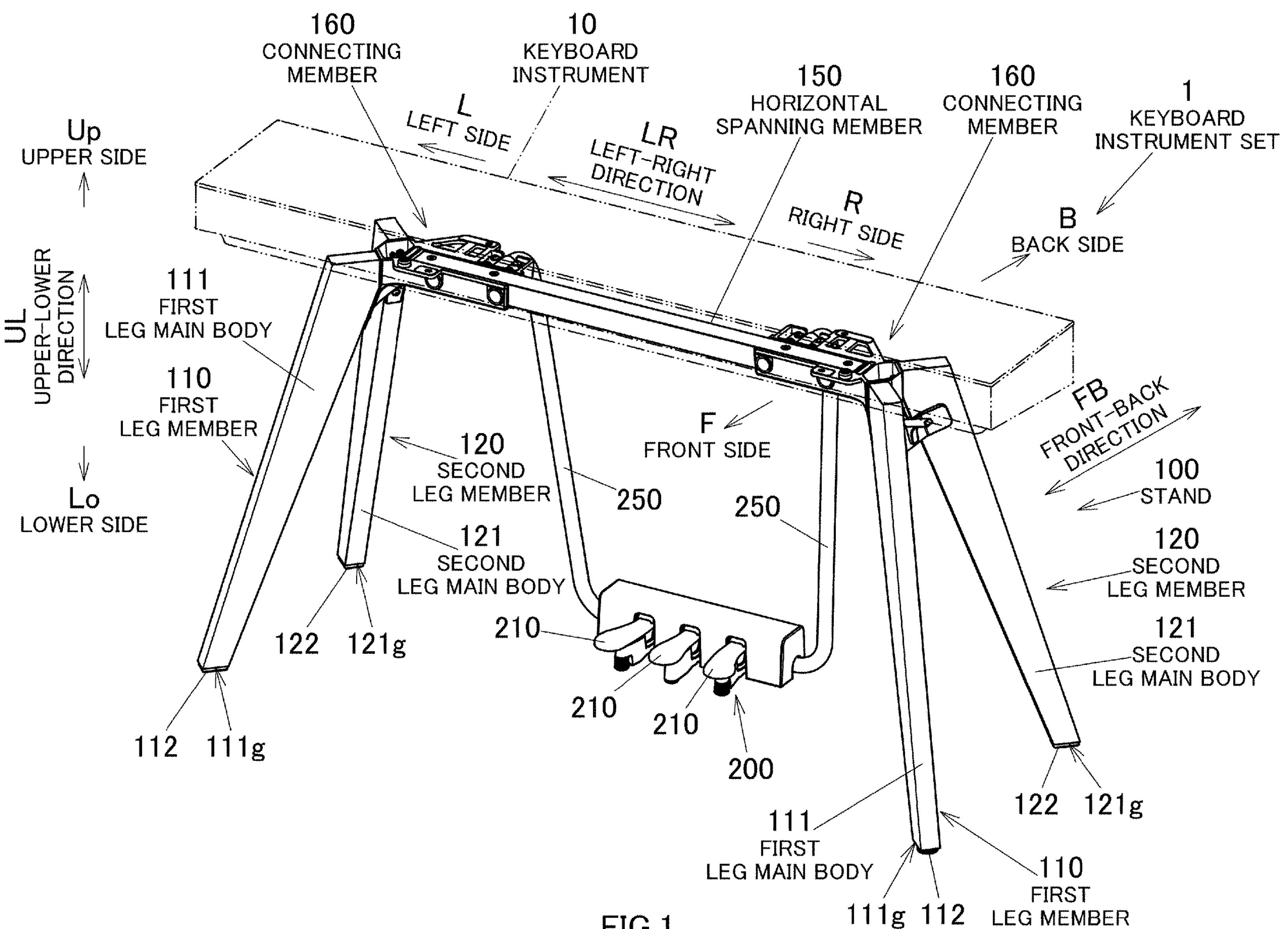
FIG. 1 is a perspective view showing a stand according to an embodiment of the present disclosure.

Hereinafter, an embodiment of the present disclosure will be described based on drawings. FIG. 1 shows a stand 100 for supporting a keyboard instrument 10 of a substantially rectangular parallelepiped shape, which is shown by chain double-dashed lines. A keyboard instrument set 1 includes the stand 100 and the keyboard instrument 10, which is disposed on an upper side of the stand 100. The stand 100 includes a pedal device 200 which includes three pedals 210. In the following description, a front-back direction of the pedals 210 (a front-back direction of keys, not shown, of the keyboard instrument 10) is referred to as a front-back direction FB. The front to the pedals 210 is referred to as a front side F (a player's side), while the back to the pedals 210 is referred to as a back side B. A direction in which the pedals 210 are aligned (an alignment direction of the keys, not shown, of the keyboard instrument 10) is referred to as a left-right direction LR. Then, when facing the pedal device 200 from the front side F, the left to the pedals 210 is referred to as a left side L, while the right to the pedals 210 is referred to as a right side R. In addition, when viewing the pedals 210 in an upper-lower direction UL thereof, an upper side is referred to as an upper side Up, while a lower side is referred to as a lower side Lo. In the present embodiment, while the keyboard instrument 10 is described as a supporting target of the stand 100, the supporting target may be other musical instruments, various types of devices, and the like.

Figure 2:
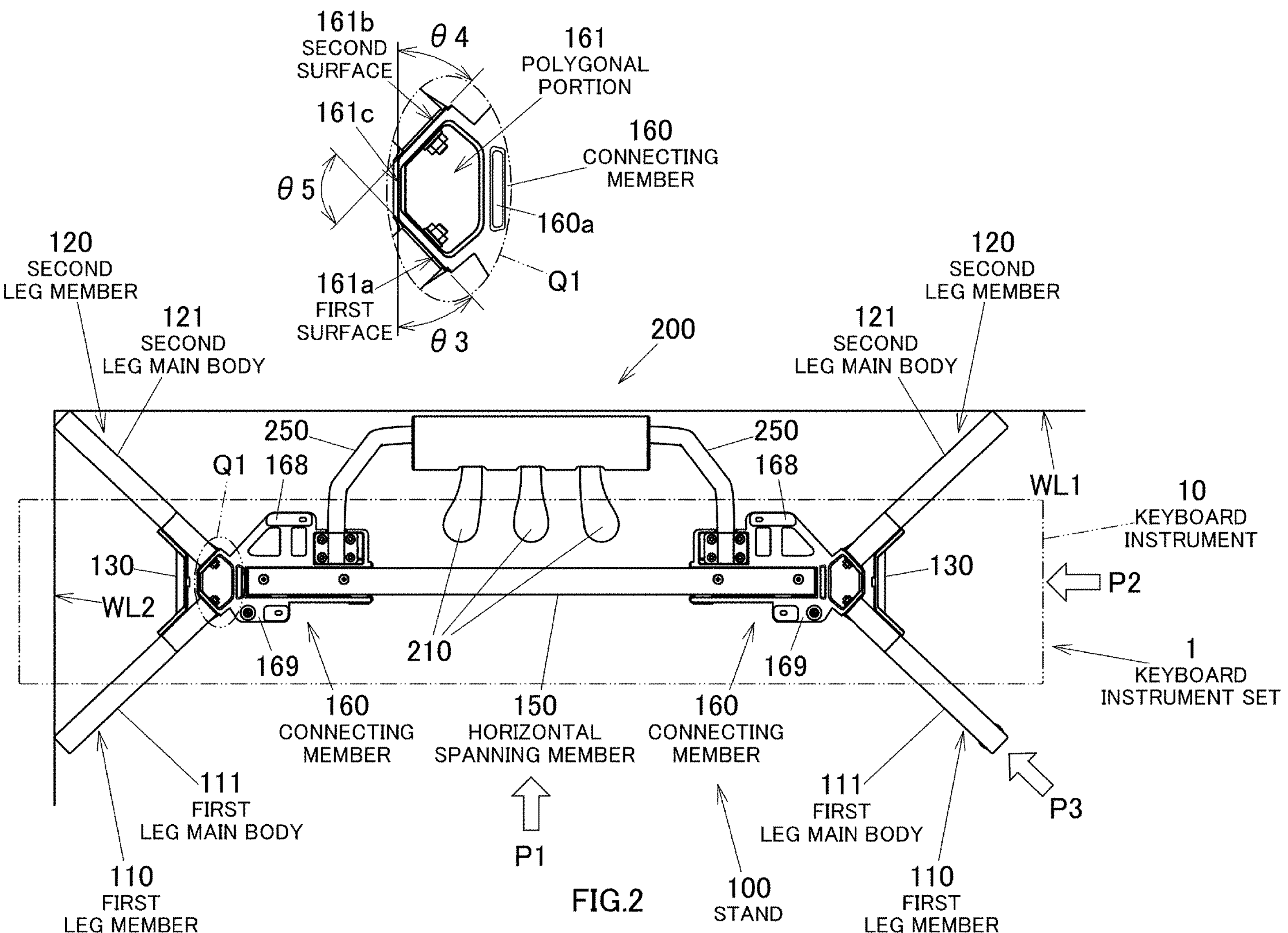
FIG. 2 is a plan view of the stand according to the embodiment of the present disclosure.

As shown in FIGS. 1 and 2, the stand 100 includes an angular tube-shaped spanning member 150, which is elongated in the left-right direction LR, two connectors 160 provided individually at both end portions of the horizontal spanning member 150, and first leg members 110 and second leg members 120, of which one first leg member 110 and one second leg member 120 are provided on each of the two connectors 160. The pedal device 200 is attached to the connectors 160 via round bar-like pedal frames 250.

The connector 160 on the right side R is provided substantially symmetrical with the connector 160 on the left side L. The first leg member 110 and the second leg member 120 which are provided on the connector 160 on the right side R are substantially the same in shape at main portions as the first leg member 110 and the second leg member 120 which are provided on the connector 160 on the left side L. Thus, in the following description, the embodiment will be described by drawing attention to the connector 160 on the left side L and the first leg member 110 and the second leg member 120 which are provided on the relevant connector 160.

Figure 3:
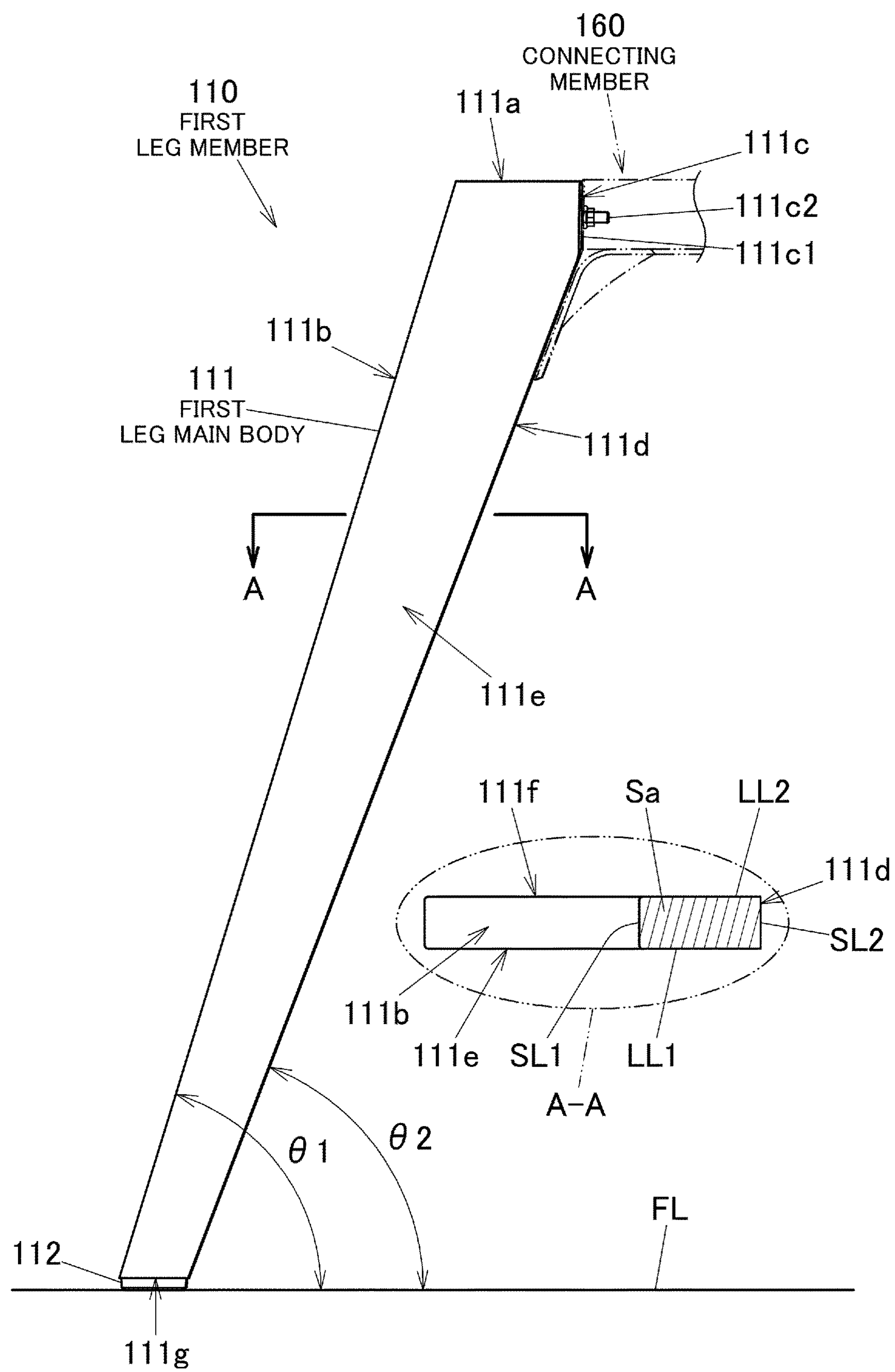
FIG. 3 is a front view showing a first leg member of the stand according to the embodiment of the present disclosure.

As shown in FIG. 3, the first leg member 110 includes a first leg main body 111. In the present embodiment, the first leg main body 111 is made up of a wood member. The first leg main body 111 includes a setting member 112 of a flat plate shape which is provided at a lower end of the first leg main body 111 in such a manner as to be brought into abutment with a setting floor surface FL. The first leg main body 111 is formed substantially into a long quadrangular shape.

The first leg main body includes a leg top surface 111*a* on an upper side Up thereof, a leg outer surface 111*b* on an outer side (an opposite side to the connector 160) which connects to the leg top surface 111*a* at an obtuse angle, and a fixing surface 111*c* on an inner side (a side facing the connector 160) which connects to the leg top surface 111*a* at right angles. Further, the first leg main body 111 includes a leg inner surface 111*d* which connects to a lower side Lo of the fixing surface 111*c* from below at an obtuse angle. Furthermore, the first leg main body 111 includes a first leg-side surface 111*e* and a second leg-side surface 111*f* which constitute two side surfaces which connect to the leg top surface 111*a*, the leg outer surface 111*b*, the fixing surface 111*c*, and the leg inner surface 111*d* substantially at right angles. Then, a leg bottom surface 11*g* connects to the leg outer surface 111*b*, the leg inner surface 111*d*, the first leg-side surface 111*e*, and the second leg-side surface 111*f* and is made parallel to the setting floor surface FL and the leg top surface 111*a*, including a setting member 112 provided thereon.

At a portion of the first leg main body 111 which is situated further downwards towards the lower side Lo than the connector 160, an angle Θ1 formed by the leg outer surface 111*b* and the setting floor surface FL, which constitutes a horizontal plane, is larger than an angle Θ2 formed by the leg inner surface 111*d* and the setting floor surface FL, which constitutes the horizontal plane (Θ1>Θ2). Both the angles Θ1, Θ2 are set to angles smaller than 90 degrees. In the present embodiment, Θ1 is about 73 degrees, and Θ2 is set to about 69 degrees. Thus, when the first leg main body 111 is seen from the side of the first leg-side surface 11*e* or the side of the second leg-side surface 111*f*, the first leg main body 111 is shaped such that it gets thicker or wider as it extends upwards towards an upper side Up thereof, while getting thinner or narrower as it extends downwards towards a lower side Lo thereof. In addition, the first leg main body 110 is disposed obliquely relative to the setting floor surface FL, and when seen in the front-back direction FB or the left-right direction LR, the first leg member 110 and the second leg member 120 are disposed in such a manner as to expand further outwards as they extend downwards towards the lower side Lo.

At the portion of the first leg main body 111 which is situated further downwards towards the lower side Lo than the connector 160, as shown in a surrounded view in FIG. 3 which shows a cross section of the first leg main body 111 taken along a line A-A in FIG. 3 or an A-A cross section, the A-A cross section (that is, a horizontal cross section Sa which is parallel to the setting floor surface FL) exhibits a rectangular shape. Here, the leg outer surface 111*b* of the first leg main body 111 corresponds, of two short sides SL1, SL2 of the rectangular shape (the cross section Sa), to one short side SL1 which is provided on an opposite side to the fixing surface 111*c* (that is a first surface 161*a*). The leg inner surface 111*d* of the first leg main body 111 corresponds, of the two short sides SL1, SL2 of the rectangular shape (the cross section Sa), to the other short side SL2 which is provided on a side facing the fixing surface 111*c* (the first surface 161*a*). The leg outer surface 111*b* is disposed on an opposite side to the leg inner surface 111*d*.

A sectional area of the rectangular cross section Sa gradually reduces as the first leg main body 111 extends further downwards towards the lower side Lo at the portion situated further downwards towards the lower side Lo than the connector 160. In the cross section Sa, the two short sides SL1, SL2 are made to remain constant in length towards the lower side Lo. On the other hand, at the portion situated further downwards towards the lower side Lo than the connector 160, two long sides LL1, LL2 of the cross section Sa gradually reduce in length as the first leg main body 111 extends further downwards towards the lower side Lo. With a cross section Sa of a portion of the first leg main body 111 which corresponds to the fixing surface 111*c* (the connector 160), since the long sides LL1, LL2 gradually extends longer towards the lower side Lo while the short sides SL1, SL2 remain constant in length along the upper-lower direction UL, a sectional area of the cross section Sa gradually increases.

A metal plate 111*cl* and an externally threaded portion 111*c*2 are provided on the fixing surface 111*c* of the first leg main body 111, and the externally threaded portion 111*c*2 projects from the fixing surface 111*c* through the metal plate 111*c*1. The metal plate 111*cl* on the fixing surface 111*c* is brought into surface abutment with the first surface 161*a* of the connector 160, which will be descried later, to be fixed thereto.

Returning to FIGS. 1 and 2, the second leg member 120 includes a second leg main body 121 having the same shape and form as those of the first leg main body 111 of the first leg member 110. That is, as shown in FIGS. 3 to 7, the second leg main body 121 includes a leg top surface 121*a*, a leg outer surface 121*b*, a leg inner surface 121*d*, a fixing surface 121*c*, a first leg-side surface 121*e*, and a second leg-side surface 121*f* and also includes a leg bottom surface 121*g* as shown in FIG. 1. As with the first leg member 110, the second leg member 120 includes a setting member 122 which is provided on the second leg main body 121. A metal plate 121*cl* and an externally threaded portion 121*c*2 are provided on the fixing surface 121*c*.

Figure 4:
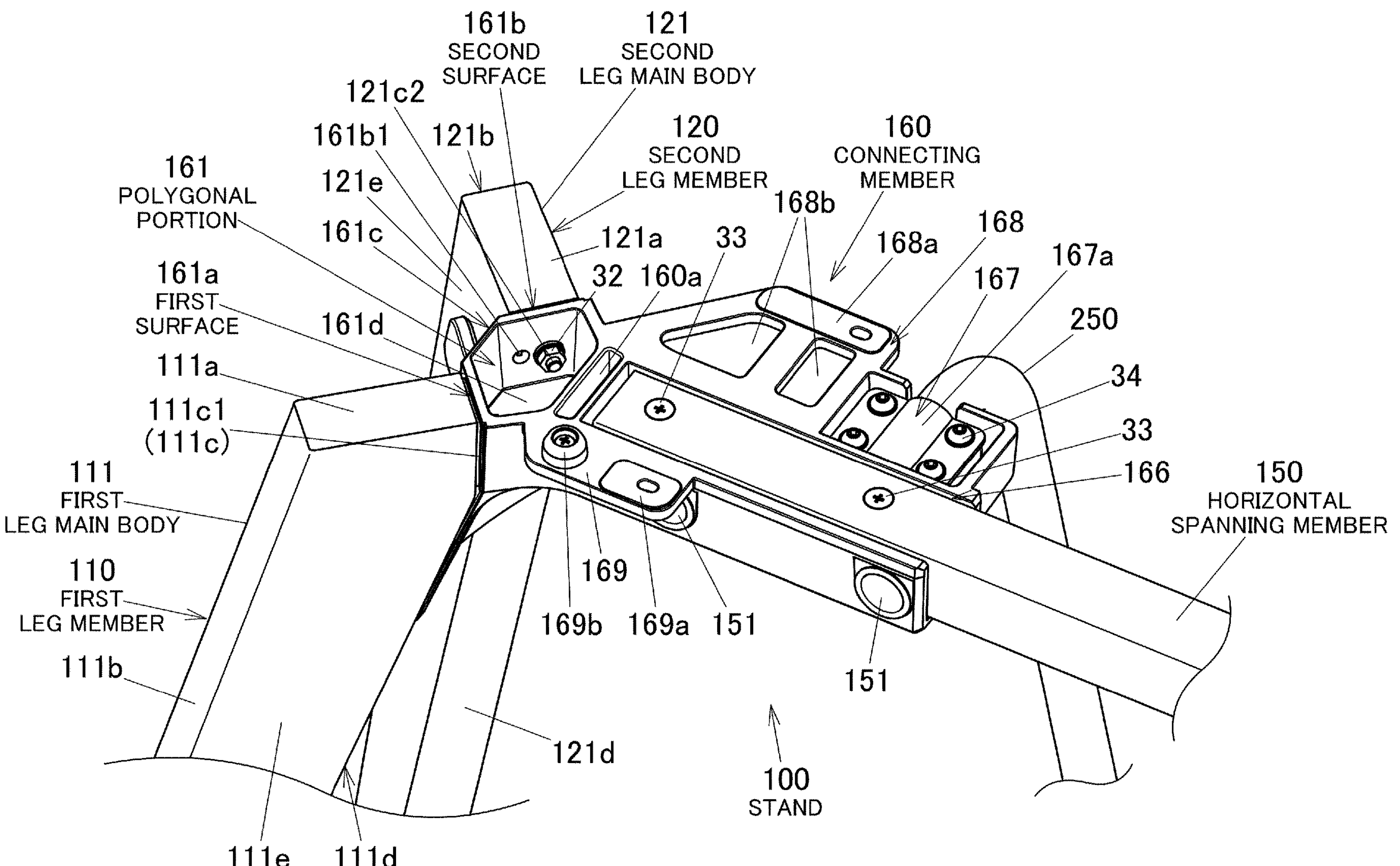
FIG. 4 is a perspective view of a circumference of a left connector of the stand according to the embodiment of the present disclosure, as viewed obliquely downwards from an upper front side.
Figure 5:
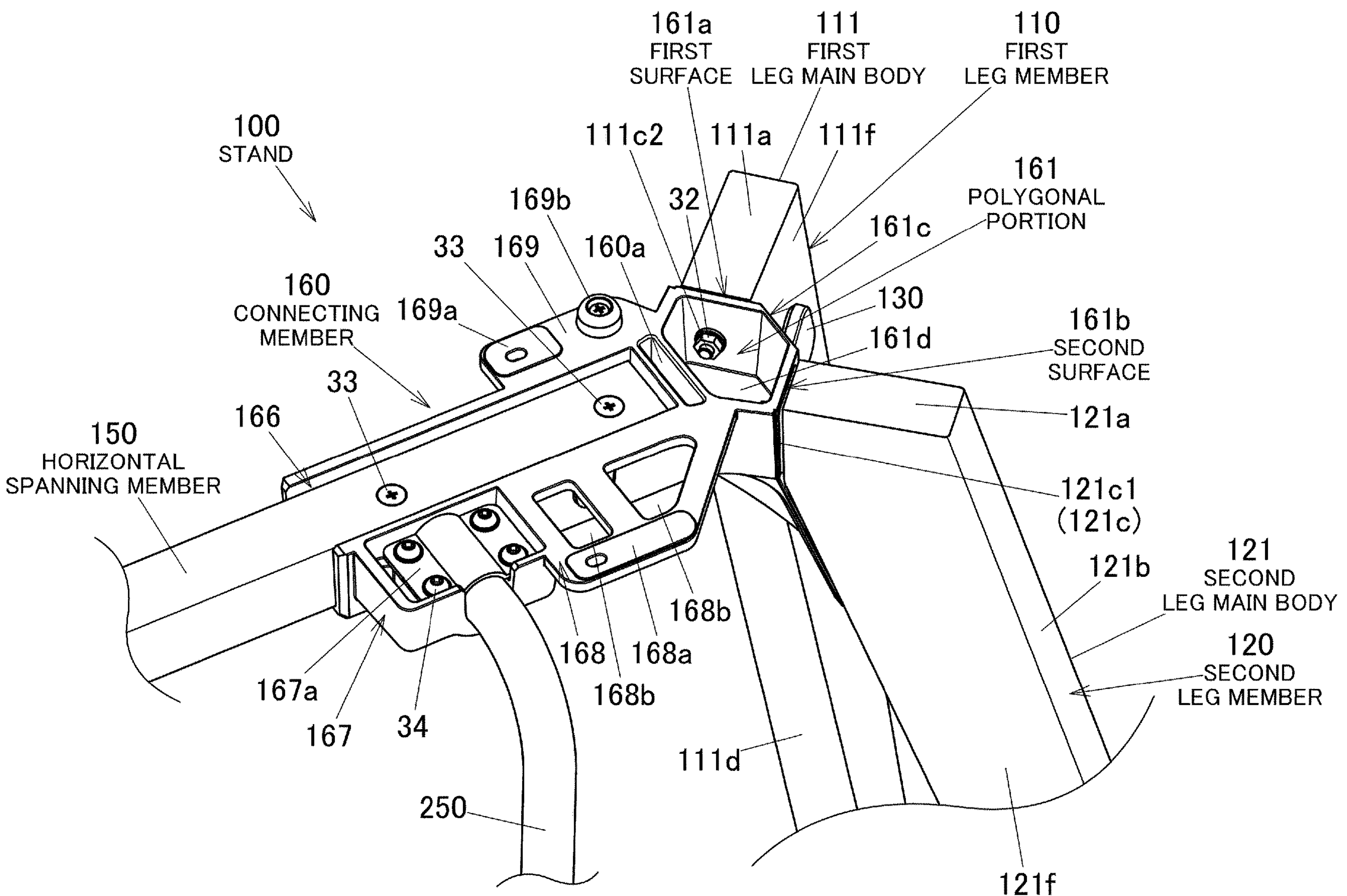
FIG. 5 is a perspective view of the circumference of the left connector of the stand according to the embodiment of the present disclosure, as viewed obliquely downwards from an upper rear side.
Figure 7:
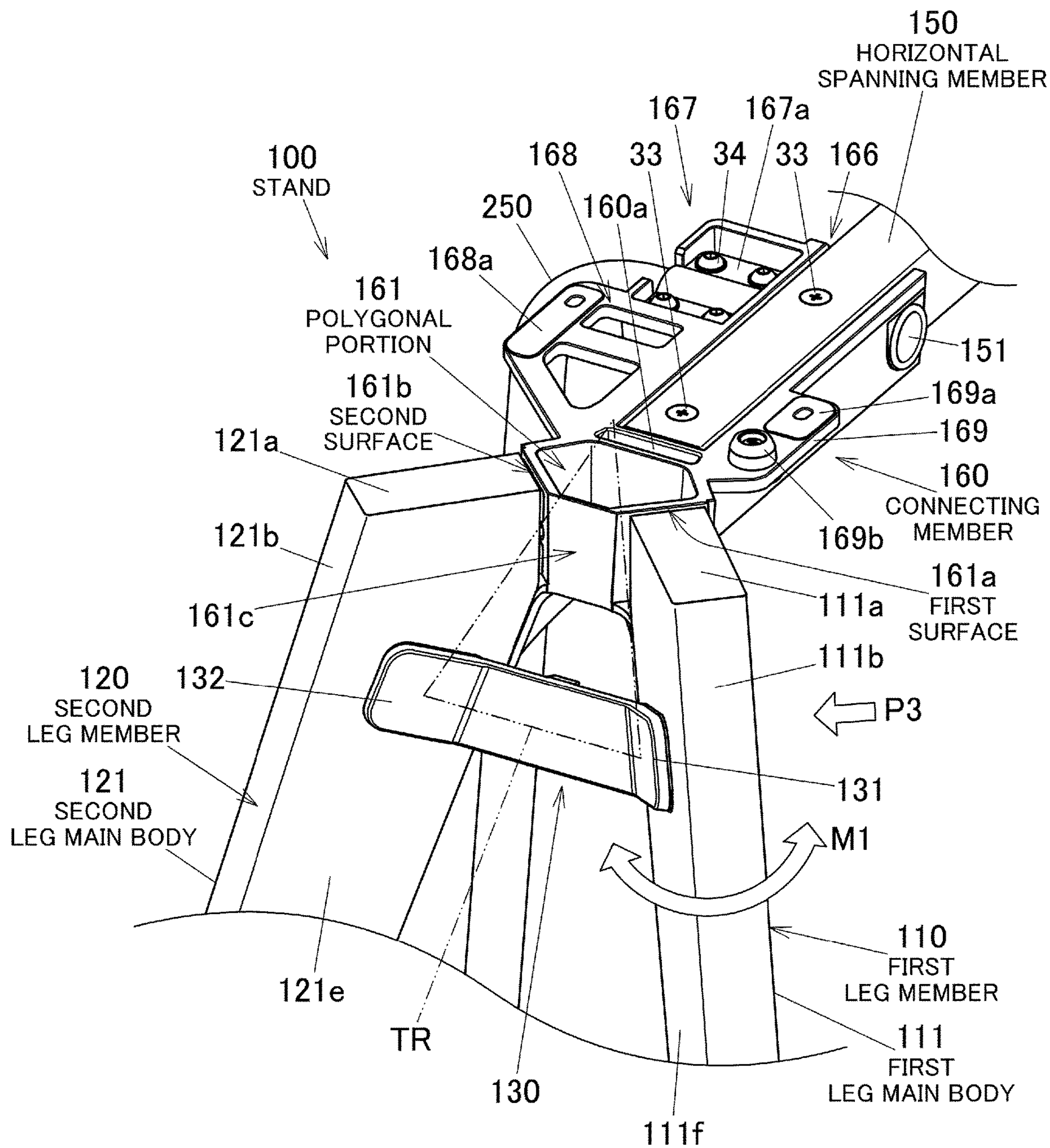
FIG. 7 is a perspective view of the circumference of the left connector of the stand according to the embodiment of the present disclosure, as viewed obliquely downwards from an upper left side.

As shown in FIGS. 4, 5, and 7, the connector 160 includes a polygonal portion 161. The connector 160 is formed from a metallic material such as aluminum alloy or the like through die casting. The polygonal portion 161 is formed substantially into a bottomed hexagonal tube shape including a bottom plate 161*d* and includes the first surface 161*a*, a second surface 161*b*, and a third surface 161*c*, which lie on an outer side of the polygonal portion or constitute outer surfaces. The fixing surface 111*c* (the metal plate 111*c*1) of the first leg main body 111 of the first leg member 110 is brought into surface abutment with the first surface 161*a* so as to be fixed thereto. Similarly, the fixing surface 121*c* (the metal plate 121*c*1) of the second leg main body 121 of the second leg member 120 is brought into surface abutment with the second surface 161*b* so as to be fixed thereto.

The first surface 161*a* to the third surface 161*c* are surfaces which are substantially parallel to the upper-lower direction UL (a vertical direction). As shown in a surrounded view of a portion Q1 in FIG. 2, the third surface 161*c* is made into a surface parallel to the front-back direction FB. An angle Θ3 formed by the first surface 161*a* and the third surface 161*c* and an angle Θ4 formed by the second surface 161*b* and the third surface 161*c* are both about 44 degrees. As a result, an angle Θ5 at which the first surface 161*a* and the second surface 161*b* intersect becomes substantially a right angle. The first surface 161*a* to the third surface 161*c* are preferably provided so that the angles Θ3, Θ4 so formed range from 40 degrees to 45 degrees.

The connector 160 includes a horizontal spanning member fixing portion 166 which is provided on an inner side (an opposite side to the first leg member 110 and the second leg member 120) of the polygonal portion 161 via a thickness-removing recessed portion 160*a*. The horizontal spanning member 150 is connected to the horizontal spanning member fixing portion 166 so as to be fixed thereto. The horizontal spanning member fixing portion 166 is formed into a recessed groove, and the horizontal spanning member 150 is fixed to the connector 160 from the upper side Up with two screw members 33. Additionally, screw members (not shown) are also passed into the horizontal spanning member fixing portion 166 from two locations on a front side F thereof via resin tubular spacers 151, whereby the horizontal spanning member 150 is fixed to the horizontal spanning member fixing portion 166 of the connector 160.

A pedal frame fixing portion 167, to which an upper end portion of the pedal frame 250 is fixed, is provided on a rear side B of the horizontal spanning member fixing portion 166. Four screw members 34 are tightly screwed into the pedal frame fixing portion 167 via a plate 167*a* so that the upper end portion of the pedal frame 250 is pressed against the pedal frame fixing portion 167 by the plate 167*a*, whereby the pedal frame 250 is fixed to the connector 160.

A rear keyboard instrument fixing portion 168, which projects towards the back side B, is provided on the connector 160 at an outer side (a side where the first leg member 110 and the second leg member 120 are disposed) of the pedal frame fixing portion 167. In addition, a front keyboard instrument fixing portion 169, which projects towards the front side F, is provided on the connector 160 in a position where the front keyboard instrument fixing portion 169 and the rear keyboard instrument fixing portion 168 face opposite each other across the horizontal spanning member 150 (the horizontal spanning member fixing portion 166). The rear keyboard instrument fixing portion 168 and the front keyboard instrument fixing portion 169 include abutment surfaces 168*a*, 169*a*, respectively, which are provided by causing predetermined areas to project towards the upper side Up. The abutment surfaces 168*a*, 169*a* constitute surfaces which are brought into abutment with a lower surface of the keyboard instrument 10. In addition, a positioning pin 169*b*, which is disposed on an outer side of the abutment surface 169*a* of the front keyboard instrument fixing portion 169, is brought into engagement with a recessed portion (not shown) provided in the lower surface of the keyboard instrument 10, whereby the keyboard instrument 10 is positioned in place. Additionally, a substantially quadrangular and triangular hole portions are provided in the rear keyboard instrument fixing portion 168 as required.

Figure 6:
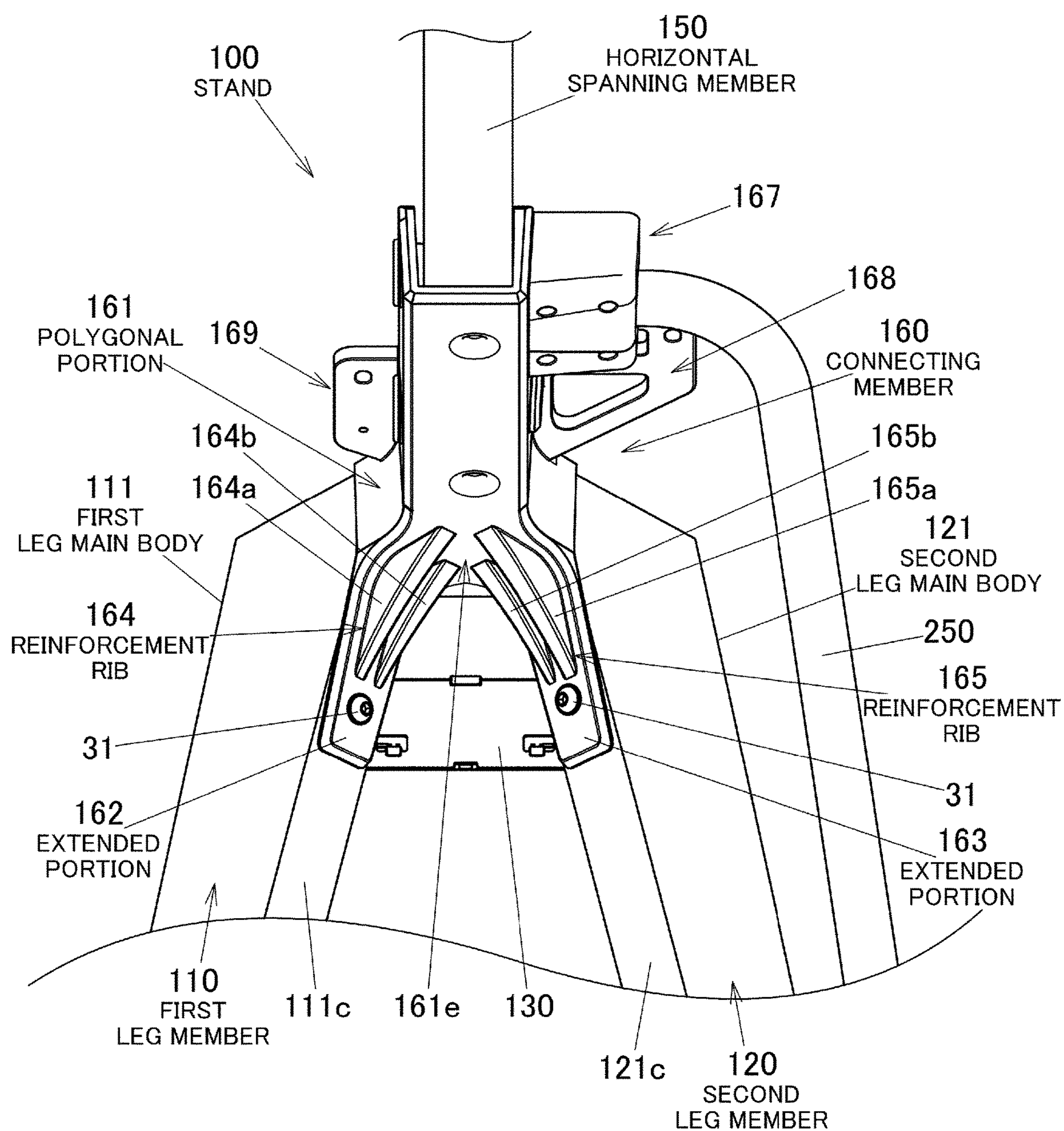
FIG. 6 is a perspective view of the circumference of the left connector of the stand according to the embodiment of the present disclosure, as viewed obliquely upwards from a lower right side.

As shown in FIG. 6, extended portions 162, 163 are provided on the connector 160 on a lower side Lo of the polygonal portion 161 in such a manner as to be extended downwards in a bifurcate fashion. The extended portion 162 is provided on the front side F, while the extended portion 163 is provided on the back side B. Reinforcement ribs 164, 165 are provided between the extended portions 162, 163 and a lower surface 161*e* of the polygonal portion 161, respectively. The reinforcement rib 164 includes two reinforcement ribs 164*a*, 164*b*, and the reinforcement rib 165 includes two reinforcement ribs 165*a*, 165*b*.

Outer reinforcement ribs 164*a*, 165*a* (a reinforcement rib on the front side F of the reinforcement rib 164 on the front side F, and a reinforcement rib on the back side B of the reinforcement rib 165 on the back side B) are formed larger in size than inner reinforcement ribs 164*b*, 165*b* (a reinforcement rib on the back side B of the reinforcement rib 164 on the front side F, and a reinforcement rib on the front side F of the reinforcement rib 165 on the back side B). In consideration of a strength against, for example, a torsional force or the like which is applied to the keyboard instrument stand 100, the larger ribs are desirably provided on an outer side of the connector 160. In the present embodiment, the reinforcement ribs 164*a*, 165*a* are provided slightly inwards of an outermost side of the connector 160. This is because the external aesthetic appearance of the stand 100 is deteriorated by disposing the large reinforcement ribs on the outermost side of the connector 160. The reinforcement ribs 164, 165 are provided in such a manner that their thickness gradually reduces as the reinforcement ribs 164, 165 extend from the lower surface of the polygonal portion 161 towards the extended portions 162, 163, respectively. In addition, screw members 31 are individually provided in the extended portions 162, 163 at lower sides Lo of the reinforcement ribs 164, 165 so that the first leg main body 111 of the first leg member 110 and the second leg main body 121 of the second leg member 120 are fixed to the extended portions 162, 163, respectively. The screw members 31 are passed through hole portions 162*b*, 163*b* (refer to FIG. 8) provided in the extended portions 162, 163, respectively, and are then screwed into internally threaded portions (not shown) provided in the first leg main body 111 and the second leg main body 121 in such a manner as to correspond to the hole portions 162*b*, 163*b*.

Figure 8:
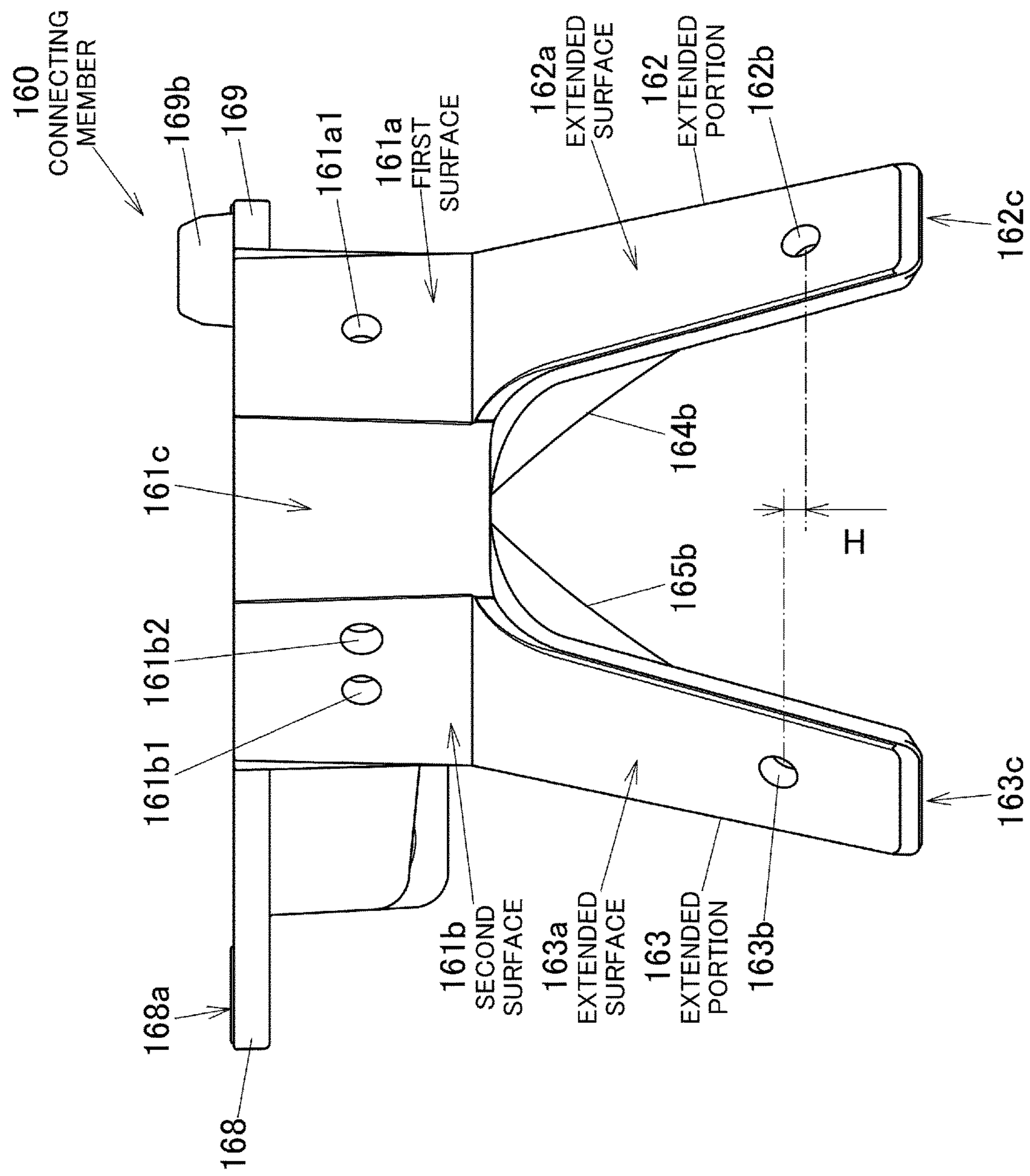
FIG. 8 is a left side view showing the left connector of the stand according to the embodiment of the present disclosure.

As shown in FIG. 8, the extended portions 162, 163 each have substantially a plate shape. The extended portions 162, 163 include extended surfaces 162*a*, 163*a*, respectively. The extended surfaces 162*a*, 163*a* continue downwards towards the lower side Lo from the first surface 161*a* and the second surface 162*a*, respectively, while being bent to extend outwards (towards the first let member 110, the second leg member 120). The externally threaded portion 111*c*2 of the first leg member 110 is inserted through a hole portion 161*al* in the first surface 161*a*, and a nut 32 is screwed onto the externally threaded portion 111*c*2 from an inner side of the polygonal portion 161 (refer to FIG. 5), whereby the first leg member 110 is fixed to the connector 160. Similarly, the externally threaded portion 121*c*2 of the second leg main body 121 is passed through a hole portion 161*b*1 in the second surface 161*b*, and a nut 32 is similarly screwed onto the externally threaded portion 121*c*2 (refer to FIG. 4), whereby the second leg member 120 is fixed to the connector 160. A projection (not shown) projecting from the metal plate 121*cl* of the second leg member 120 is passed through a hole portion 161*b*2 formed adjacent to the hole portion 161*b*1. As a result, the second leg member 120 is restricted from being erroneously attached to the first surface 161*a*.

Further, hole portions 162*b*, 163*b* are provided in the extended portions 162, 163, respectively. The screw members 31, with which the first leg member 110 and the second leg member 120 are fixed, are passed individually through the hole portions 162*b*, 163*b*. The hole portions 162*b*, 163*b* are disposed at different heights from lower ends of the corresponding extended portions 162, 163. Specifically speaking, the hole portion 162*b* is provided in a position which lies lower by a distance H than a position where the hole portion 163*b* is provided. The first leg member 110 and the second leg member 120 are made to be attached in place without any error by making the positions of the hole portions 162*b*, 163*b* so different.

In addition, as shown in FIG. 7, an angle brace member 130 is provided between the first leg main body 111 of the first leg member 110 and the second leg main body 121 of the second leg member 120 in such a manner as to span a space defined therebetween. The angle brace member 130 has substantially a rectangular plate shape, and bent end portions thereof are made individually into fixing plate portions 131, 132. The fixing plate portion 131 is brought into surface abutment with the second leg-side surface 111*f* of the first leg main body 111 and is then fixed thereto with a screw member (not shown). The fixing plate portion 132 is brought into surface abutment with the first leg-side surface 121*e* of the second leg main body 121 and is then fixed thereto with a screw member (not shown).

With the stand 100, a rigidity of the second leg member 120 (the second leg main body 121) will be described which is required in the case that the keyboard instrument 10 is pushed from the front side F to the back side B with a force P1 in such a state that the lower ends of the two second leg members 120 on the back side B are left in abutment with a wall surface WL1, as shown in FIG. 2. In general, a cross-sectional secondary moment for a rectangular cross section is expressed as below:

$$Bh3/12 \tag{1}$$

Figure 9:
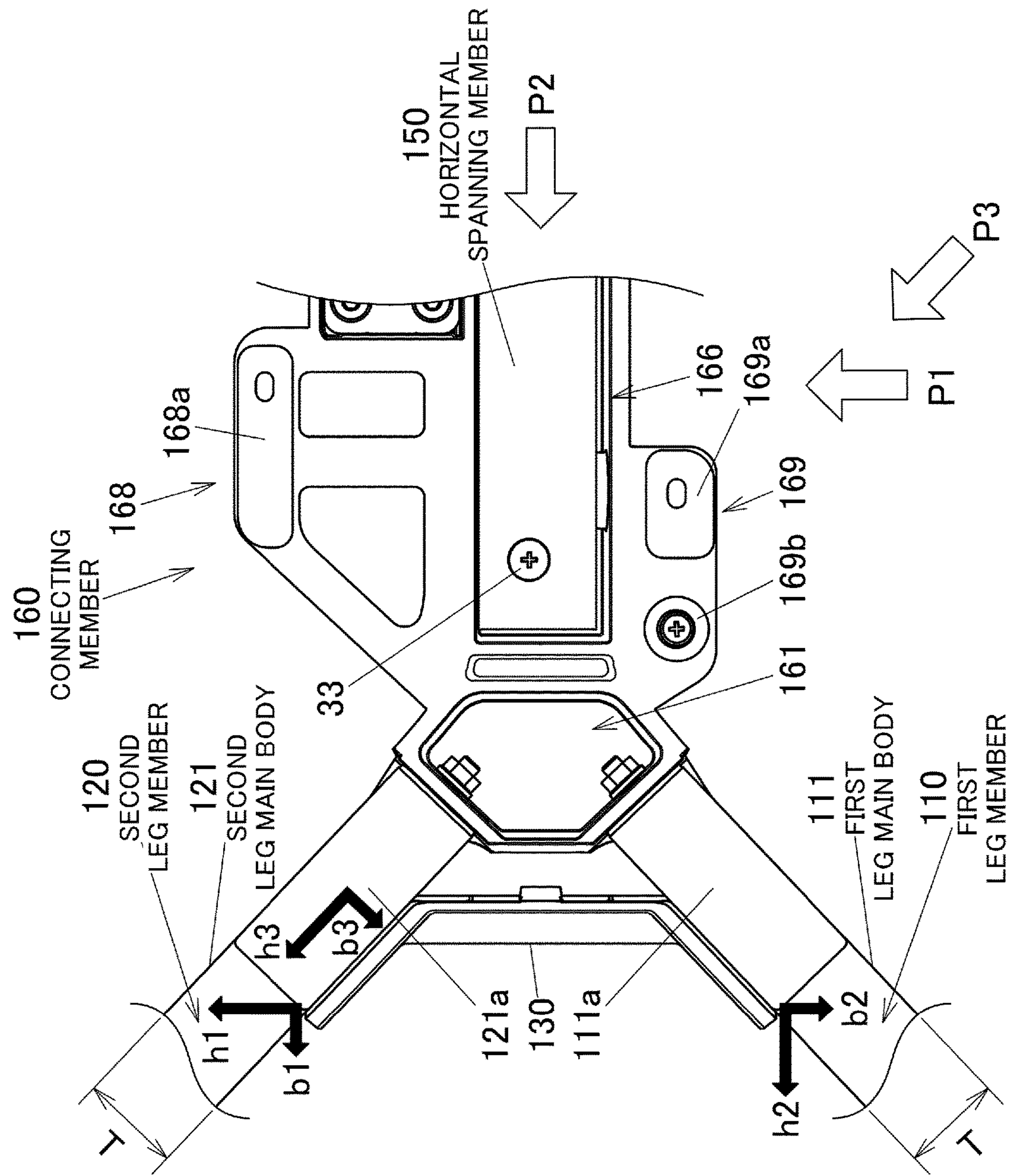
FIG. 9 is a plan view showing a circumference of a connecting portion where the left connector connects with the first leg member and a second leg member in the stand according to the embodiment of the present disclosure.

In the case that the keyboard instrument 10 is pushed from the front side F with the force P1, as shown in FIG. 9, a component vector of the force P1 applied to the second leg main body 121 is expressed by a vector h1 in the front-back direction FB and a vector b1 in the left-right direction LR. In this case, the "h" in the expression (1) shows a length of a horizontal cross section of the second leg main body 121 which corresponds to the direction of the vector h1 (hereinafter, referred to simply as a "cross section length") and the "b" in the expression (1) shows a cross section length of the second leg main body 121 which corresponds to the direction of the vector b1. The cross section length of the second leg main body 121 which corresponds to the direction of the vector h1 is larger than a thickness T of the second leg main body 121. The "h" in the expression (1) is cubed. Consequently, as in the present embodiment, the rigidity of the second leg main body 121 can be enhanced by disposing the second leg main body 121 (the second leg member 120) substantially at the angle of 45 degrees relative to the front-back direction FB. The same can also be true with the first leg member 110 in the case that the keyboard instrument 10 is pushed from the back side B with the force P1.

In addition, with the stand 100, rigidities of the first leg member 110 and the second leg member 120 will be described which are required in the case that the keyboard instrument 10 is pushed from the left side L to the right side R with a force P2 in such a state that the lower ends of the first leg member 110 and the second leg member 120 on the left side L are left in abutment with a wall surface WL2, as shown in FIG. 2. Here, let's assume that the wall surface WL2 constitutes a low step-like wall surface and that the keyboard instrument 10 is not in abutment with the wall surface WL2. In the case that the keyboard instrument 10 is pushed from the right side R with the force P2, as shown in FIG. 9, a component vector of the force P2 applied to the first leg main body 111 is expressed by a vector h2 in the left-right direction LR and a vector b2 in the front-back direction FB. In this case, the "h" in the expression (1) shows a cross section length of the first leg main body 111 which corresponds to the direction of the vector h2, and the "b" in the expression (1) shows a cross section length of the first leg main body 111 which corresponds to the direction of the vector b2. The cross section length of the first leg main body 111 which corresponds to the direction of the vector h2 is larger than a thickness T of the first leg main body 111. Then, the "h" in the expression (1) is cubed. Consequently, as in the present embodiment, the rigidity of the first let main body 111 can be enhanced by disposing the first leg main body 111 (the first leg member 110) substantially at the angle of 45 degrees relative to the front-back direction FB. This will be true with the second leg member 120 (the second leg main body 121).

With the stand 100, in such a state that the second leg member 120 on the left side L is in abutment with a corner portion between the wall WL1 and the wall WL2, as shown in FIG. 2, the case that the keyboard instrument 10 is pushed from the front side F on the right side R to the back side B on the left side L with a force P3 which is applied in an inclined direction which is inclined substantially at an angle of 45 degrees from the front-back direction FB will be discussed. In this case, the "h" in the expression (1) shows a cross section length of the second leg main body 121 which corresponds to the direction of a vector h3, that is, the long sides LL1, LL2 (refer to FIG. 3) of the rectangular shape, and the "b" in the expression (1) shows a cross section length of the second leg main body 121 which corresponds to the direction of a vector b3, that is, the thickness T (the short sides SL1, SL2, refer to FIG. 3) of the second leg main body 121.

In this way, the rigidities of the first leg member 110 and the second leg member 120 in the front-back direction FB and the left-right direction LR in which the first leg member 110 and the second leg member 120 are normally liable to bear the forces expressed by P1, P2 can be enhanced by disposing the first surface 161*a* and the second surface 162*a* substantially at the angle of 45 degrees relative to the front-back direction FB (or the left-right direction LR) and disposing the first surface 161*a* and the second surface 162*a* in such a manner as to intersect each other substantially at right angles. Then, with the stand 100 of the present embodiment, not only the thick leg members are simply used to be disposed substantially at the angle of 45 degrees relative to the front-back direction FB, but also the first leg main body 111 and the second leg main body 121 are configured such that the sectional areas of their rectangular cross sections gradually reduce as the first leg main body 111 and the second leg main body 121 extend further downwards. As a result, the stand 100 can be provided which enhances the design property thereof while enhancing particularly the rigidity at the upper part (the side closer to the keyboard instrument 10) thereof.

The polygonal portion 161 only needs to be configured such that the first surface 161*a* and the second surface 161*b* are disposed, for example, substantially at the angle of 45 degrees relative to the front-back direction FB (or the left-right direction LR). That is, the polygonal portion 161 can be formed into a substantially pentagonal tube shape or a substantially triangular tube shape in addition to the substantially hexagonal shape as in the present embodiment. The polygonal portion 161 includes the bottom plate 161*d* and is then formed into the bottomed tube shape, whereby the rigidity of the polygonal portion 161 can be enhanced.

In addition, as shown in FIG. 7, in the case that a torsional force M1 is applied to the first leg member 110 (the second leg member 120), a risk of a failure of the first leg member 110 (the second leg member 120) is reduced because a truss construction TR is defined by the first leg member 110 (the first leg main body 111), the second leg member 120 (the second leg main body 121), and the angle brace member 130.

Further, the first leg member 110 (the second leg member 120) is supported by the angle brace member 130 against the force P3 from the directions of the first leg-side surfaces 11*e*, 121*e* and the second leg-side surfaces 111*f*, 121*f*, whereby a risk of a failure of the first leg member 110 (the second leg member 120) is reduced. The angle brace member 130 is disposed near the leg top surfaces 111*a*, 121*a*, whereby the angle brace member 130 is concealed behind the keyboard instrument 10 so as to be made hardly visible in the stand

100 to which the keyboard instrument 10, which tends to be seen from the upper side Up in many cases, is fixed.

As in a conventional stand like the one disclosed by the publication of Japanese Utility Model Registration No. 3182648, in the case that the bar-shaped legs are attached to the housing through thread connection, it is considered that the diameter of the externally threaded portion is increased or that the connecting surface between the housing and the leg is increased. However, these configurations introduce an enlargement in size of the stand itself, whereby the design of the stand is deteriorated.

In contrast to this, with the embodiment of the present disclosure, the stand 100 includes the horizontal spanning member 150, the connectors 160 each including the polygonal portion 161 and provided on the horizontal spanning member 150, and the first leg members 110 each including the first leg main body 111 having the rectangular horizontal cross section Sa and fixed to the first surface 161*a* of the polygonal portion 161.

As a result, the forces P1, P2 in the front-back direction FB and the left-right direction LR can be borne by thicknesses T1, T2 which are equal to or larger than a thickness T3 of the member (the first leg main body 111). Thus, the stand 100 can be provided which has the highly rigid legs (the first leg members 110). Then, the design property of the stand 100 can be enhanced by the first leg members 110 each made up of the angular bar.

In addition, the connector 160 includes the extended portion 162 including the extended surface 162*a* on the lower side Lo of the first surface 161*a*, and the reinforcement rib 164 is provided between the extended portion 162 and the lower surface 161*e* of the polygonal portion 161. As a result, since the first leg member 110 can be supported by the highly rigid connector 160, the first leg member 110 and the connector 160 can be connected with high strength.

The first leg main body 111 includes the fixing surface 111*c* which is brought into surface abutment with the first surface 161*a* to thereby be fixed thereto. As a result, the stand 100 can be provided which is easy to be built up by adopting the simple configuration in which the first leg main body 111 is brought into surface abutment with the connector 160 to thereby be fixed together with the nut 32.

The sectional area of the rectangular cross section Sa gradually reduces as the first leg main body 111 extends further downwards at the portion situated further downwards towards the lower side Lo than the connector 160. As a result, since the first leg member 110 can be provided which is thick at the portion on the upper side Up and is thin at the portion on the lower side Lo, the strength of the connecting portion of the first leg member 110 with the connector 160 can be enhanced highly while providing the good design property.

The leg main body 111 includes the leg inner surface 111*d* which is provided on the side facing the first surface 161*a* which corresponds to the short sides SL1, SL2 of the rectangular shape and the leg outer surface 111*b* which lies opposite to the leg inner surface 111*d* at the portion situated further downwards than the connector 160, and the angle Θ2 formed between the leg inner surface 111*d* and the horizontal plane (the setting floor surface FL) is smaller than the angle Θ1 formed by the leg outer surface 111*b* and the horizontal plane. As a result, the first leg member 110 can be provided which has the high design property.

In addition, at the portion of the first leg main body 111 which is situated further downwards towards the lower side Lo than the connector 160, the lengths of the long sides LL1, LL2 of the rectangular cross section Sa gradually reduce. As a result, the stand 100 is made to look as being thinner on the lower side Lo, whereby an imaginal impression can be provided that the keyboard instrument 10 supported by the stand 100 looks floating in the air.

The first surface 161*a* is provided parallel to the vertical direction. As a result, since the connecting construction between the connector 160 and the first leg member 110 can be made simple in form, the stand 100 can be provided of which the design property is enhanced.

The first surface 161*a* is provided such that the angle Θ3 formed by the first surface 161*a* and the front-back direction FB ranges from 40 degrees to 45 degrees. As a result, the first leg member 110 including the rectangular cross section Sa can be disposed so as to be strong enough to bear the forces P1, P2 from the front-back direction FB and the left-right direction LR (so as to bear the relevant forces P1, P2 with the thicknesses T1, T2).

Additionally, the connector 160 is provided at each of the end portions of the horizontal spanning member 150, and the polygonal portion 161 includes the first surface 161*a* and the second surface 161*b* which intersect at right angles. The second leg member 120, which includes the second leg main body 121 of the same form as that of the first leg main body 111, is fixed to the second surface 161*b*. As a result, the stand 100 having the four legs can be configured in which the first leg member 110 and the second leg member 120 are disposed on each of the left and right sides.

The angle brace member 130 is provided between the first leg main body 111 and the second leg main body 121 in such a manner as to span the space defined therebetween. As a result, the stand 100 can be provided which includes the legs whose strength is further enhanced.

The keyboard instrument set 1 includes the stand 100 and the keyboard instrument 10 disposed on the upper side of the stand 100. As a result, the keyboard instrument set 1 can be provided which includes the stand 100 supporting the keyboard instrument 10 and having the high design property, the high strength, and the high rigidity.

While the embodiment of the present disclosure has been described heretofore, the embodiment is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents.

What is claimed is:

1. A keyboard stand comprising:

a horizontal spanning member having a support surface configured to support a keyboard;

a connector provided at each end of the horizontal spanning member and comprising a polygonal portion having a polygonal shape with the horizontal spanning member is being fixed relative to the polygonal portion; and a first leg member comprising a first leg main body having a rectangular horizontal cross section and an upper end portion that is configured to be fixed to a first one of a plurality of transverse surfaces of the polygonal portion that cooperate to at least partially form the polygonal shape thereof, wherein the connector comprises an extended portion comprising an extended surface that extends from the first one of the transvers surfaces downward, and wherein a reinforcement rib is provided between the extended portion and a lower surface of the polygonal portion below the transverse surfaces thereof.

2. The keyboard stand according to claim 1, wherein the first leg main body comprises a fixing surface which is brought into surface abutment with the first one of the transverse surfaces so as to be fixed thereto.

3. The keyboard stand according to claim 1, wherein a sectional area of the rectangular shape gradually reduces as the first leg main body extends further downwards at a portion of the first leg main body which is situated further downwards towards a lower side than the connector.

4. The keyboard stand according to claim 1, wherein the first leg main body comprises a leg inner surface provided on a side facing the first one of the transverse surfaces corresponding to a short side of the rectangular shape and a leg outer surface lying opposite to the leg inner surface at a portion of the first leg main body which is situated further downwards towards a lower side than the connector, and wherein an angle formed by the leg inner surface and a horizontal plane is smaller than an angle formed by the leg outer surface and the horizontal plane.

5. The keyboard stand according to claim 1, wherein a length of the long sides of the rectangular shape gradually reduces as the first leg main body extends further downwards at a portion of the first leg main body which is situated further downwards towards a lower side than the connector.

6. The keyboard stand according to claim 1, wherein the first surface is provided parallel to a vertical direction.

7. A keyboard stand comprising:

a horizontal spanning member having a support surface configured to support a keyboard;

a connector provided at each end of the horizontal spanning member and comprising a polygonal portion having a polygonal shape with the horizontal spanning member being fixed relative to the polygonal portion; and a first leg member comprising a first leg main body having a rectangular horizontal cross section and an upper end portion that is configured to be fixed to a first one of a plurality of transverse surfaces of the polygonal portion that cooperate to at least partially form the polygonal shape thereof, wherein the first one of the transverse surfaces is provided in such a manner that an angle formed by the first one of the transverse surfaces and a front-back direction ranges from 40 degrees to 45 degrees.

8. The keyboard stand according to claim 7, wherein the connector comprises an extended portion comprising an extended surface that extends from the first one of the transverse surfaces downward, and wherein a reinforcement rib is provided between the extended portion and a lower surface of the polygonal portion below the transverse surfaces thereof.

9. The keyboard stand according to claim 7, wherein the connector is provided at each of end portions of the horizontal spanning member, wherein the polygonal portion comprises a second one of the transverse surfaces which intersects substantially at right angles to the first one of the transverse surfaces, and wherein a second leg member comprising a second leg main body of substantially the same form as that of the first leg main body is fixed to the second surface.

10. The keyboard stand according to claim 9, wherein an angle brace member is provided between the first leg main body and the second leg main body in such a manner as to span a space defined therebetween.

11. A keyboard instrument set comprising:

the keyboard stand according to claim 1; and a keyboard instrument disposed on an upper side of the stand.

* * * * *